(No Model.)
W. L. SILVEY.
SECONDARY BATTERY.
No. 504,370.  Patented Sept. 5, 1893.
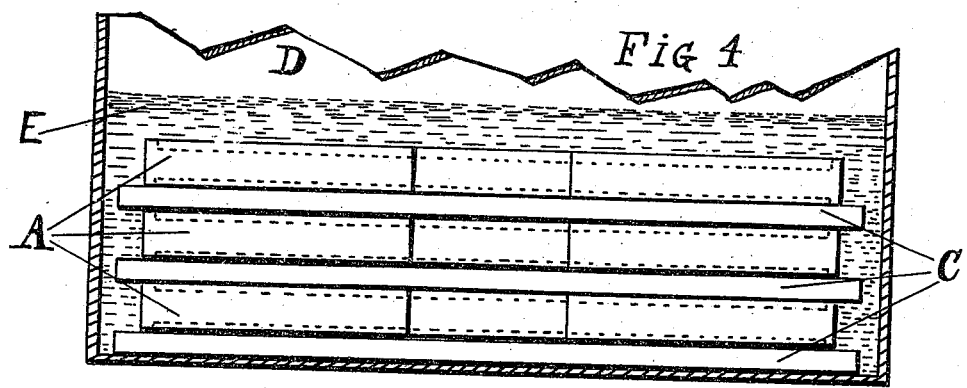
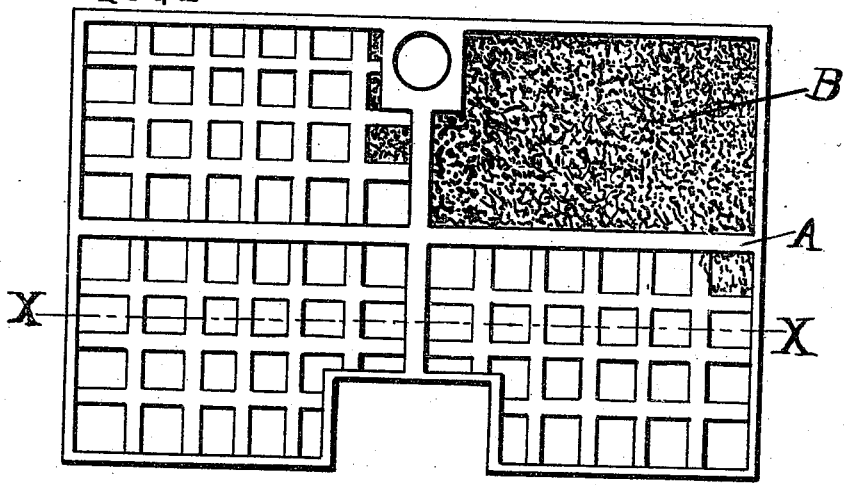
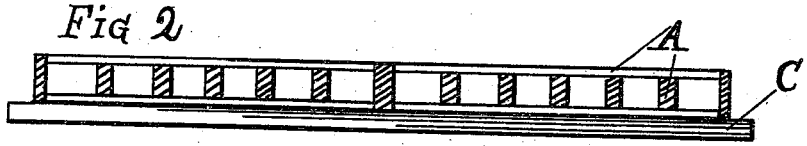
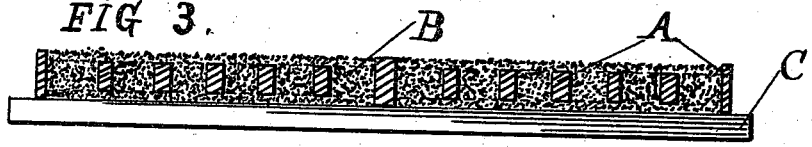
WITNESSES—
C. U. Raymond
H. J. Miller
INVENTOR—
William L. Silvey

UNITED STATES PATENT OFFICE.

WILLIAM L. SILVEY, OF LIMA, OHIO.

SECONDARY BATTERY.

SPECIFICATION forming part of Letters Patent No. 504,370, dated September 5, 1893.

Application filed July 8, 1892. Serial No. 439,363. (No model.)

*To all whom it may concern:*

Be it known that I, WILLIAM L. SILVEY, a citizen of the United States, residing at Lima, in the county of Allen and State of Ohio, have invented certain new and useful Improvements in Secondary Batteries; and I do hereby declare the following to be a full, clear, and exact description of the invention, such as will enable others skilled in the art to which it appertains to make and use the same.

My invention relates particularly to the means for and methods of producing the electrodes of batteries adaptable as both a primary and secondary source of electrical generation.

To carry my invention into effect I proceed as follows referring particularly to the accompanying drawings which are made a part hereof.

Figure 1, is a plan view of my improved electrode A, partially filled with a metallic oxide B. Fig. 2, is a longitudinal section of the electrode, frame, or support, along the dotted line X X of Fig. 1. Fig. 3, represents a section of the same frame shown in Fig. 2, having the filling or active material B in place. Fig. 4, is a broken section of a battery cell partially filled with liquid and containing some electrodes prepared by my improved process.

It has been known for many years that a primary battery containing a metallic oxide would give a very high electro motive force, it having been investigated by Bequerel and De La Rive and later by Planté, and described in his communications to the scientific societies in which he says that an electrode of platinum or carbon around which was heaped peroxide of lead was found to give a current of higher tension than the batteries of either Grove or Bunsen. This was further investigated by Niaudet who found that a lead electrode was a good substitute for platinum in a battery.

Bequerel describes a battery in which sulphate of lead mixed with a sea salt in certain proportions was consolidated around a lead rod of one fourth to one fifth of an inch in diameter, forming an active metallic oxide surface. This is described in the United States Patent No. 185,288 under the name of oxychloride of lead (3PbClPbO) with a conducting plate of metallic lead as the negative electrode of a battery. I have found that owing to the salt contained in oxychloride of lead which contains a large quantity of chlorine gas, the oxychloride is not well adapted to the purposes of a secondary battery owing to the fact, that the salt must be extracted by soaking the plates in water or in other liquid having a great affinity for the chloride of sodium and its products. Otherwise the hydrogen will not be absorbed, fixed or combined in the negative electrode. If the chloride is not extracted before the plates are charged or formed a chloride of lead is deposited on the negative electrode which almost entirely suppresses the chemical action necessary to produce a perfectly working reversing or secondary battery of high electro motive force, it being understood that both the positive and negative electrodes are substantially the same in this case.

De La Rive in his investigations found the peroxide of lead ($PbO_2$) gave the highest intensity of current by heaping it around platinum or carbon. This I have found to be true; but a battery of this character is not suitable for commercial purposes, because if adapted to the multiple plate cell where a very low material resistance is required, it is very hard to keep the powdered oxide in place unless subjected to some treatment before subjecting the plates to a charging current.

In United States Letters Patent granted to Charles F. Brush, No. 260,654, dated July 4, 1882, Nos. 337,298, 337,299, dated March 2, 1886, No. 260,653, dated July 4, 1882, and No. 266,089, dated October 17, 1882, secondary battery electrodes are described in which a metallic oxide is primarily produced or applied to an electrode support, and subjected to very heavy pressure thereby consolidating the whole into a firm coherent mass. I have found where this plan has been employed by myself that the oxides of lead ($PbO_2$ and PbO) when pressed onto or into the support plate while in a dry state and immersed in a solution of sulphuric acid and water, will absorb the sulphur so rapidly as to expand enough to become loosened from the metallic support to which it was consolidated. For this reason my invention does not relate to a plate which is made firm by heavy pressure or other equivalent means, but to one in which the active material (metallic oxide) is made to adhere or hardened in place by chemical means. I have found that the more the support plate is covered by active material the longer the plate will last because the material first acted upon will be the one most oxidized. For this reason I have found that while a perforated support plate is best as a conductor, at the same time a plate having the active oxides filled into the holes alone, allows the grid to be attacked more violently than the active material itself, and therefore the positive plates will soon be all converted into an oxide and the conducting plate being destroyed as a conductor, the positive plate becomes practically worthless. To avoid this very serious difficulty I almost entirely inclose my conductor plates A, in the active oxides B. In practice I construct my electrodes as follows: As a framework foundation or conductor plate A, I cast a suitable perforated frame work of lead or lead alloy: this plate forms what is usually termed a grid, having cross bars united at their junctions. The outer ledge or rim is elevated a little above the common surface of the plate as also one or more cross bars (where the plates are large) crossing the face of the plate as shown in Figs. 1, 2, and 3. This latter may be avoided if desired but the ledge around the rim is almost indispensable as it serves to hold the plate more rigid, and it serves to hold the active material in the plate until it has become fixed by chemical action. The plate having been cast is now laid on its side on a platen C, which may be of wood, gutta percha, metals, &c., but I prefer making it of a very porous material practically indestructible in a sulphuric acid electrolyte, such as wood pulp board or even pasteboard or parchment may be used. Having placed the plate in a horizontal position on the platen as described, I now take a metallic oxide as red lead or litharge in a dry powder and sprinkle it into the holes and over the plate until all the interstices are filled and a lower surface and a top surface layer are produced practically inclosing the grid in the metallic oxide. I now take a striker and strike off all the surplus material from the surface, leaving the active material level with the top of the outer ledge. This operation of filling or covering the plate with a layer of metallic oxide being finished another platen is placed on top of the plate, then another grid, and the filling process repeated until the required number is produced. They are now taken and placed in a suitable containing cell and covered with a solution of sulphuric acid and water of from 15° to 30° Baumé gage, and left in this solution until the active oxides have become thoroughly saturated with the electrolyte at which time they will become thoroughly hardened and adherent and the platens C, may be removed and the plates dried ready for use. An oxide of lead when treated in a sulphuric acid solution will expand considerably, but by placing the powdered lead oxide ($PbO$ and $PbO_2$) in contact with the plate as I have described the active material is sufficiently porous to allow for this expansion without becoming loosened from the support plate A, or in any wise expanding the plate. In fact the pickling and filling process which I have described serves to firmly unite the active material (or material to become active) to the support without any undue violent action and by so doing neither the plate nor the metallic oxide are in any wise strained or disintegrated. In the construction of my battery plates or electrodes I prefer to use bioxide of lead for the positive plates, and protoxide of lead for the negative plates. Having pickled or hardened my plates and after drying them so as to avoid burning the hands or destroying the clothing with the acid, I assemble my plates in a suitable number and place them in suitable containing cells, the positive plates being the red lead plates and the litharge plates being the negative plates, and charge them in the usual manner for charging secondary batteries. It is a notable incident that cells made by my process after having been mounted after having been pickled in the hardening or primary acid solution already described, and before having been charged by an electric current at all, are found to be able to produce a primary electric current; in fact twelve cells have been known to produce as much as fourteen volts, thereby showing the reversibility of the battery made by my process. I do not limit myself strictly to a mechanical device in this case, but wish at the same time to cover the essential features in its production.

Having fully described my invention, what I claim as new, and wish to secure by Letters Patent of the United States, is as follows:

1. The process of making secondary battery plates which consists in preparing plates with perforations or openings filling the openings and covering the sides of the plate with an oxide of lead in the form of a dry powder, then uniting them together by combining them with a solution containing sulphuric acid, and afterward forming them in another solution.

2. The process of making secondary battery plates which consists in preparing a plate with ribs and perforations, filling the perforations with powered oxide of lead in a dry state, then pickling the whole in a bath of a solution containing sulphuric acid until the oxide has become hardened and afterward forming them by the passage of an electric current.

3. The process of making secondary battery plates which consists in making a support plate with perforations, filling the perforations with oxide of lead in a dry state then pickling the whole in an acid solution and afterward forming the plates ready for use.

4. The process of making secondary battery plates which consists in preparing perforated plates of metal, placing the perforated plates on porous sheets of a nonconducting material, filling the perforations in the metal conducting plate with a dry powdered oxide of lead, then pickling the whole in a solution of sulphuric acid and afterward forming the plates ready for use.

5. The process for making secondary battery plates which consists in laying suitable open frames or grids horizontally on porous platens, then filling the openings in the frames or plates with an oxide of lead in the form of a loose dry powder then immersing the whole in an acid solution and leaving it remain therein until the powder has become thoroughly hardened into an adherent mass in contact with the frame, then removing the plates thus hardened and afterward assembling them and forming them in the usual manner.

In testimony whereof I affix my signature in presence of two witnesses.

WILLIAM L. SILVEY.

Witnesses:
JOHN KIRBY, Jr.,
C. U. RAYMOND.